United States Patent
Hemmerlein et al.

(10) Patent No.: US 7,956,701 B2
(45) Date of Patent: Jun. 7, 2011

(54) CONTACTLESS TRANSMISSION OF A DIFFERENTIAL SIGNAL BETWEEN A TRANSMITTER AND A RECEIVER

(75) Inventors: Markus Hemmerlein, Neunkirchen/Br (DE); Helmut Repp, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 179 days.

(21) Appl. No.: 12/245,233

(22) Filed: Oct. 3, 2008

(65) Prior Publication Data

US 2009/0091403 A1    Apr. 9, 2009

(30) Foreign Application Priority Data

Oct. 8, 2007  (DE) .......................... 10 2007 048 164

(51) Int. Cl.
 *H01P 5/08*   (2006.01)
 *H04B 1/40*   (2006.01)
 *G02B 6/42*   (2006.01)

(52) U.S. Cl. .......................... 333/24 C; 398/41; 385/39
(58) Field of Classification Search ................ 333/24 R, 333/24 C, 167, 177, 181; 385/39; 398/41
See application file for complete search history.

(56) References Cited

U.S. PATENT DOCUMENTS 4,979,218 A    12/1990  Strahm

FOREIGN PATENT DOCUMENTS

| DE | 195 03 106 A1 | 8/1995 |
|---|---|---|
| EP | 0 303 410 A2 | 2/1989 |

OTHER PUBLICATIONS

German Office Action dated Jul. 18, 2008 with English translation.

*Primary Examiner* — Dean O Takaoka
(74) *Attorney, Agent, or Firm* — Lempia Summerfield Katz LLC

(57) ABSTRACT

A method for the contactless transmission of at least one differential signal between a transmitter and a receiver given the existence of at least one common-mode noise signal, which has a low frequency in comparison with at least one signal to be transmitted, is provided. The suppression of at least one common-mode noise signal within the receiver a ground reference potential assigned to the receiver is separated into two ground reference potentials decoupled from one another. At least one common-mode noise signal may be suppressed by a filter unit at the input of a receive amplifier of the receiver.

21 Claims, 2 Drawing Sheets

CONTACTLESS TRANSMISSION OF A DIFFERENTIAL SIGNAL BETWEEN A TRANSMITTER AND A RECEIVER

This patent document claims the benefit of German Patent Application No. DE 10 2007 048 164.2 filed on Oct. 8, 2007, which is hereby incorporated by reference.

BACKGROUND

The present embodiments relate to contactless transmission of at least one differential signal between a transmitter and a receiver given the existence of at least one common-mode noise signal. In particular, the present embodiments may relate to contactless transmission of at least one common-mode noise signal, which has a low frequency in comparison with at least one signal to be transmitted.

Data or signals may be transmitted in contactless fashion between modules. For example, in medical technology, a computer tomography has a rotating part and a stationary part, between which data is transmitted.

The contactless wideband transmission of differential high-frequency signals between a transmitter and a receiver, such as the two different modules, may have relatively strong and low-frequency common-mode interference effects, which impair the quality of transmission. The signal to be transmitted exhibits a spectrum in which the signal power in the range of high frequencies is distributed over a wide frequency band. Whereas the signal power in the frequency range beneath a limit frequency is insignificantly low. The lower limit frequency is in turn extremely low in comparison with the bandwidth of the signal. Typically, the bandwidth should be at least ten times as great as the lower limit frequency.

A differential driver serves as a rule to feed the signal into an antenna with two inputs with their polarity inverted with respect to one another, which generates an electromagnetic field that can be described as an overlay of two fields. The one field is characterized by feeding the same signal into both inputs (common mode) and the other field is characterized by signals inverted with respect to one another at the inputs (push pull). A metallic coupling structure, which is not in contact with the antenna but is situated in the immediate vicinity of the antenna, is used for contactless tapping of the field of the antenna in the close-up range. At the two outputs of the metallic coupling structure, two signals are tapped. The two signals can be split into a skew-symmetric portion and a straight-symmetric portion. A signal fed equally into both inputs of the antenna does not produce a skew-symmetric signal portion in the coupling structure output. An inverted signal should not produce any straight-symmetric signal portions.

The two weak signals at the coupling structure outputs are forwarded by way of two lines to a differential amplifier in the receiver. The differential amplifier should in an ideal situation amplify the skew-symmetric signal portion, which is available for further signal processing. The two signals, at the input of the differential amplifier, do not exceed the permissible working range of the amplifier input. If the working range of the amplifier input is exceeded, then errors occur with a frequency, which is no longer tolerable in the case of a data signal to be transmitted with regard to the subsequent clock or data recovery.

The danger that the permissible working range of the amplifier input will be exceeded exists if the straight-symmetric signal portion, such as the common-mode signal becomes too great at the input of the differential amplifier. Ideally, the common-mode signal would not be present.

There are three reasons for the occurrence of the common-mode signal. A first cause may be imbalances in the output stages of the line drivers can cause common-mode interference effects. A second cause may be an imbalance in the coupling, for example, as a result of positioning errors or manufacturing tolerances, can bring about a common-mode signal correlated with a useful signal.

A third cause for the occurrence of common-mode interference (so-called common-mode signal) is a mismatch of potential between the ground reference systems of the transmitter and receiver in the case of unequal reference systems. If the field caused by the mismatch of potential of the ground reference systems in the area of a coupling structure has the property such that the difference in potential of both ground potentials couples into both coupler halves with equal strength, then the interference is present as a common-mode signal at the input of the differential amplifier in the receiver and overlays the differential useful signal there. If a tolerable level is exceeded, an error-free clock and data recovery or a clock and data recovery, which is errored up to a tolerable extent, is no longer possible.

If the field caused by the mismatch of potential of the ground reference systems couples into both coupler halves with a different strength, then one part of the voltage is fed between the two reference potentials as a push-pull signal into the two lines to the amplifier input and overlays the differential useful signal. A suppression by the differential amplifier is not possible. A satisfactory clock and data recovery can also be endangered as a result.

The first-mentioned portions of the common-mode interference caused by imbalances in the amplitude are considerably smaller than the amplitude of the differential useful signal, with the result that they normally do not lead to overdriving of a working range of the amplifier input and can be tolerated. The common-mode interference effects caused by the voltage between the two ground potentials can exceed the useful signal amplitude by orders of magnitude, such that the signal quality drops intolerably as a result of the then unavoidable overdriving of the amplifier input.

SUMMARY AND DESCRIPTION

The present embodiments may obviate one or more of the drawbacks or limitations inherent in the related art. For example, in one embodiment, a method enhanced for the contactless transmission of at least one differential signal between a transmitter and a receiver given the existence of at least one common-mode noise signal, in particular of at least one, in comparison with at least one signal to be transmitted, low-frequency common-mode noise signal is provided.

In order to suppress at least one common-mode noise signal within the receiver a ground reference potential assigned to the receiver is separated into two ground reference potentials decoupled from one another, and/or that at least one common-mode noise signal is suppressed by a filter unit at the input of a receive amplifier of the receiver. For the purpose of common-mode noise signal suppression, a passive filter unit is used. The passive filter attenuates at least one common-mode noise signal present in a coupler for decoupling at least one signal from the transmitter at the receiver at least essentially to the same extent as a signal of the same frequency to be transmitted, and/or that a ground reference potential relating to a part of the receiver including a receive amplifier is coupled capacitively to a ground reference potential of the transmitter.

For example, the ground reference potential of the receiver is divided or separated, into two areas. The two areas are decoupled from one another. The common-mode interference or the common-mode noise signal or signals may fall at the point of this division or a corresponding separation point such that the portion of the common-mode interference which falls at the input of the differential amplifier in the receiver is reduced. The two ground reference potentials, or ground potentials, are divided into two potentials, which can be referred to for example as "Ground" (GND) and "Receiver Ground" (RX-GND). Through this separation, an effective common-mode noise signal suppression is achieved when choosing suitable areas for the division. The differential useful signal to be transmitted, such as a wideband high-frequency signal, can be transmitted without major disruption with regard to the clock and data recovery.

Alternatively or additionally, a filter unit at an input of a receive amplifier may suppress common-mode noise signals. The filter unit may be a passive filter unit, which attenuates at least one common-mode noise signal present in a coupler for coupling at least one signal from the transmitter to the receiver at least essentially to the same extent as a signal of the same frequency to be transmitted. Alternatively or additionally, in order to suppress common-mode interference effects, a ground reference potential relating to a part of the receiver including a receive amplifier can be capacitively coupled to a ground reference potential of the transmitter.

Depending on the separation (taking place if applicable) of the ground reference potential, at least one signal related to the two decoupled ground reference potentials can be separated, in particular at least one useful signal and/or at least one control and/or monitoring signal and/or the power supply. All signals may be separated. When the ground reference potentials are split up, then all the signals, which exceed the separation of the ground potentials (for example GND and RX-GND) or their areas and relate to both ground potentials, may be separated. The separation can take place in the receiver in a different manner, depending on the particular type of the signals.

Depending on the separation of the ground reference potential, an associated supply voltage can be separated. The supply voltage lines may be separated. The division may be performed within the framework of the division of the ground reference potentials.

The ground reference potential may be separated in the receiver at a separating point in such a manner that at least a significant part of at least one common-mode noise signal drops off at this separating point, and/or the ground reference potential can be separated in a frequency range with a high spectral power density of at least one common-mode noise signal.

The separation, if this is undertaken, may takes place in such a manner that an effective suppression or reduction of the common-mode interference is possible or occurs. The separation is undertaken such that as high a portion as possible of the noise signal drops off at the separating point or in the area of the separation, or the separation occurs in an area of the noise signal in which its power density is high in order to achieve an effective reduction or suppression of the noise signal. The separation can take place in a circuit arrangement in a circuit block.

Where applicable the ground reference potential and/or a supply voltage can be separated by at least one common-mode choke coil, such as a common-mode choke coil with a high attenuation in the area of at least one common-mode noise signal. A common-mode choke coil (GS) may be inserted into a corresponding circuit, for example, into a block for separating the ground reference potentials, which has as high an attenuation as possible for the frequency range of the common-mode interference or of a plurality of common-mode noise signals.

At least one signal, such as a low-frequency control and/or monitoring signal, can be separated by at least one optocoupler and/or transducer, and/or at least one signal, such as a high-frequency useful signal, can be separated by at least one optoelectrical converter and optical waveguide.

For control and monitoring, optocouplers or transducers are used for separation of low-frequency signals. The optocouplers and transducers do exhibit parasitic capacitances. Accordingly, small inductances can additionally be inserted into the lines. The incorporation of such inductances is always required in situations when the impedance of the decoupling becomes too low for the spectral ranges of the common-mode interference to be decoupled on account of the parasitic capacitances.

For the separation of high-frequency signals, such as digital useful signals, with a high data rate, an implementation of the separation by optocouplers or transducers can present technical difficulties, with the result that in this case optoelectrical converters and corresponding electrooptical converters (E/O and O/E), which are connected by way of optical waveguides, can be used.

Within the framework of a separation, such as when using at least one optoelectrical converter and optical waveguide, at least one analog signal can be modulated and/or at least one digital signal can be encoded. With an appropriate modulation or encoding of the signals, the separation of the signals can take place by optoelectrical converters in combination with optical waveguides.

A filter unit may be used at one input of a receive amplifier of the receiver to suppress at least one common-mode noise signal. The filtering, for example, without a separation of the ground reference potentials, may result in a reduction in the common-mode noise signals. However, appropriate dimensioning of the filtering in addition to the separation of the ground reference potentials of the receiver may be provided.

The impedance of the termination of the line to the receive amplifier, which is effective for the common-mode interference, may be kept as low as possible. Although limits are set here by the technical feasibility, the impedance may be chosen to be not greater than the impedance effective for the differential useful signal. Lower impedances effective for common-mode interference effects cannot be implemented at least in the case of wideband useful signals on account of the parasitic effects experienced with the currently available components. The filter at the input of the input amplifier, which at the same time terminates the line between a coupler and the input amplifier, is optimally dimensioned. Nothing more than absolutely necessary drops off the one or more noise signals at the input of the differential amplifier. This represents a considerable improvement on previous approaches in which the effective impedance has often been chosen to be far too high because the termination of the common-mode signal has been used for determining the operating point of the amplifier in that a constant voltage or a voltage regulated at an extremely low frequency has been fed in at high impedance by way of the termination. The input resistance range is implemented with as low a resistance as possible in order to maximize the signal to noise distance. Any further increase in the input resistance reduces the signal to noise distance with regard to the common-mode interference effects.

Tor the purpose of common-mode noise signal suppression a passive filter unit can be used. The passive filter may attenuate at least one common-mode noise signal present in a coupler for decoupling at least one signal from the transmitter to the receiver at least essentially to the same extent as a signal to be transmitted or useful signal of the same frequency.

There is currently no useable passive implementation known in which a common-mode interference fed into the coupler is attenuated more strongly than the differential useful signal to be transmitted at the same frequency. Although in a filter a double-wound coil ("common mode suppression choke") could be used, in which on account of its winding a high inductance is effective for common-mode interference effects whereas the inductance effective for the useful signal is considerably lower, the problem of parasitic effects may be present. Accordingly, the requirements for a high inductance for low-frequency common-mode noise signals and an extremely low inductance for high-frequency differential signals cannot be satisfied simultaneously.

The causes of the common-mode interference may be resolved, for example, by an electrical connection of the ground reference potentials. The electrical connection of the ground reference potentials results in a comparatively high implementation effort and the danger of wear affecting a mechanical contact, such as a collector ring, for example. The dust originating from the wear may be deposited on modules located in the vicinity and cause short-circuits.

The background to the problems involved in using common-mode choke coils is the fact that for the dimensioning of the common-mode choke coil the inductance effective for common-mode signals should be chosen such that, for the frequencies for which the spectral power density of the common-mode interference has its maximum, an impedance results which, compared with the termination of the input amplifier effective for common-mode signals, is so much higher to the extent that the amplitude of the portion of the common-mode interference which is present at the input of the amplifier is adequately attenuated for the correct operation of the amplifier. At the same time, the inductance effective for the differential signals must nevertheless, for all the frequencies in the useful signal band, lead to an impedance which is considerably lower than the impedance, effective for the differential signals, of the termination of the input amplifier in order that the useful signal is not too greatly attenuated. These two requirements result in the fact that, as described, on the one hand an extremely high inductance is required for common-mode signals if the common-mode interference effects are low-frequency, whereas on the other hand an extremely low inductance is required for differential signals if a wide useful signal band is available in the range of high frequencies. On account of parasitic effects no common-mode choke coils can be manufactured in this manner such that both requirements are satisfied at the same time if the signal band comprises high frequencies and the common-mode interference is extremely low-frequency. It is therefore helpful to ensure that the differences in the reference potentials occurring in the system are as small as possible, the causes of the interference in other words are eliminated as far as possible, by means of the described electrical connection for example.

A filter or a filter unit (which if applicable can include of a plurality of individual filters), may compensate for the common-mode interference with active components. Such a type of active implementation is not suitable for high data rates on account of the limited bandwidth, the parasitic elements, and the delays of active components.

A passive filter unit or a passive filter, which attenuates common-mode interference fed into the coupler equally as well or to the same extent as the differential useful signal to be transmitted at the same frequency, includes an optimum from the aspect of feasibility.

Two identical filters, which are not coupled to one another, may be used as the filter unit in a signal line leading from one half of a coupler to an input of a receive amplifier of the receiver. Identical filters, which are not coupled to one another, may be inserted in the two lines on which the differential signal passes from the coupler to the input amplifier. However, no filters are used with which push-pull signals are strongly attenuated at any frequency than common-mode signals.

At least one common-mode noise signal situated in a different frequency band to at least one signal to be transmitted can be suppressed by a transmission function, which is to be assigned to or is assigned to, the filter unit. The transmission function introduced by the filtering can, when the two portions of the input signal of the amplifier are situated in different frequency bands, be used in order to attenuate the common-mode interference compared with the useful signal without the common-mode interference becoming overly attenuated. The two portions may include the portion of the useful signal and the portion of the common-mode interference.

The filter unit may include at least one highpass filter. The type of the particular (optimum) filter depends on the type of the useful signal in comparison with the common-mode interference or with the plurality of common-mode interference effects.

The ground reference potential relating to a part of the receiver containing a receive amplifier can be coupled capacitively to a ground reference potential of the transmitter.

Between the two antenna lines exists a surface whose potential does not depend on the excitation by the differential useful signal. If a conductive structure is placed into this surface, then this has no influence on the transmission of the common-mode signals since no currents flow within this surface on account of the potential, which is the same everywhere. Accordingly, the structure of a coupler can be placed into this surface, as a result of which an additional coupling of the ground potentials is achieved without any degradation of the quality of transmission of the useful signal.

The capacitive coupling can be combined with the use of the filter unit or the division of the ground reference potentials in order to achieve an overall optimum common-mode noise signal suppression. The capacitive coupling suppresses common-mode interference effects.

A metallic structure capacitive coupling may connected to the corresponding ground reference potential of the receiver. The capacitive coupling may be arranged in the vicinity of a ground reference surface assigned to the ground reference potential of the transmitter. A metallic structure, which is connected to the ground potential of the part of the receiver that includes the input amplifier, such as the ground reference system GND, is placed in the vicinity of a ground surface of the ground reference system of the transmitter ("Transmitter Ground", TX-GND). The antenna/coupler arrangement may be a homogeneous double line with a symmetry plane on which the potential is 0 when fed inversely with respect to one another the capacitive coupling of the ground potentials can be implemented as a result of the fact that the metallic structure is arranged precisely in this symmetry plane. The coupling structure is situated in the immediate vicinity of the coupling or of the location of the coupling of the differential signal without having any disadvantageous influence on the mode of operation of the coupling facility in respect of the transmission of skew-symmetric signals.

At least one signal to be transmitted can be further processed after passing through a receive amplifier of the receiver, for example, at least partially in the receiver having the ground reference potential assigned to the receive amplifier. The signal processing can, at least partially, also still take place in the part of a circuit arrangement that relates to the ground reference potential GND of the receive amplifier. For example, a clock and data recovery can be performed in this area. Depending on the processing methods, which are executed in the signal processing block, it is possible for high-frequency signals to also still occur at the output of the signal processing block. Low-frequency signals occur for controlling and/or monitoring the signal transmission or processing.

In one embodiment, a circuit arrangement, which is designed in order to execute a method of the type described above is provided. The circuit arrangement may be used for the contactless transmission of at least one differential signal between a transmitter and a receiver of the circuit arrangement given the existence of at least one common-mode noise signal, such as at least one common-mode noise signal which has a low frequency in comparison with at least one signal to be transmitted. The circuit arrangement for the suppression of at least one common-mode noise signal within the receiver has at least one circuit element that is designed for the separation of a ground reference potential assigned to the receiver into two ground reference potentials decoupled from one another and/or has a filter unit at the input of a receive amplifier of the receiver which is designed for the suppression of at least one common-mode noise signal. A passive filter unit may be used for common-mode noise signal suppression. The passive filter unit attenuates at least one common-mode noise signal present in a coupler for decoupling at least one signal from the transmitter at the receiver at least essentially to the same extent as a signal of the same frequency to be transmitted, and/or whereby the circuit arrangement has at least one circuit element which is designed for the capacitive coupling of a ground reference potential relating to a part of the receiver containing a receive amplifier to a ground reference potential of the transmitter.

The circuit arrangement has a transmitter and a receiver, between which differential signals, such as high-frequency signals, are to be transmitted in contactless, in particular wideband, fashion. In this situation the transmitter and the receiver are arranged in two modules, for example, as component parts of a rotating part and stationary part of a computer tomography or some other medical facility.

A circuit element is provided with which a separation of a ground reference potential assigned to the receiver into two ground reference potentials decoupled from one another is possible. This circuit element includes a separating element, which takes the form of a separating block, for example, for the separation of the reference potentials. A separation of the ground potentials into the two potential areas GND or RX-GND is possible.

The circuit arrangement can have at least one common-mode choke coil for the separation of the ground reference potential and/or a supply voltage, for example, a common-mode choke coil with a high attenuation in the area of at least one common-mode noise signal.

The circuit arrangement can have at least one optocoupler and/or transducer and/or optoelectrical converter with optical waveguide designed for the separation of at least one signal. Optocouplers and/or transducers are to be recommended in this situation, as has already been described above, for the separation of low-frequency signals, whereas in the case of high-frequency signals such as digital useful signals having high data rates optoelectrical converters in conjunction with optical waveguides enable a separation which is comparatively simple to implement.

The circuit arrangement can have at least one filter unit designed for the suppression of at least one common-mode noise signal, such as a passive filter unit having two identical filters which are not coupled to one another.

A capacitive coupling of a ground reference system GND of the receiver to the ground reference system TX-GND of the transmitter can take place by way of a metallic structure in the vicinity of a ground reference surface assigned to the ground reference potential of the transmitter.

The statements made in relation to the method according to the invention apply in analogous fashion to the circuit arrangement.

BRIEF DESCRIPTION OF THE DRAWINGS

Further advantages, features and details will be described with reference to the following embodiments and to the drawings. In the drawings.

DETAILED DESCRIPTION

Figure 1:
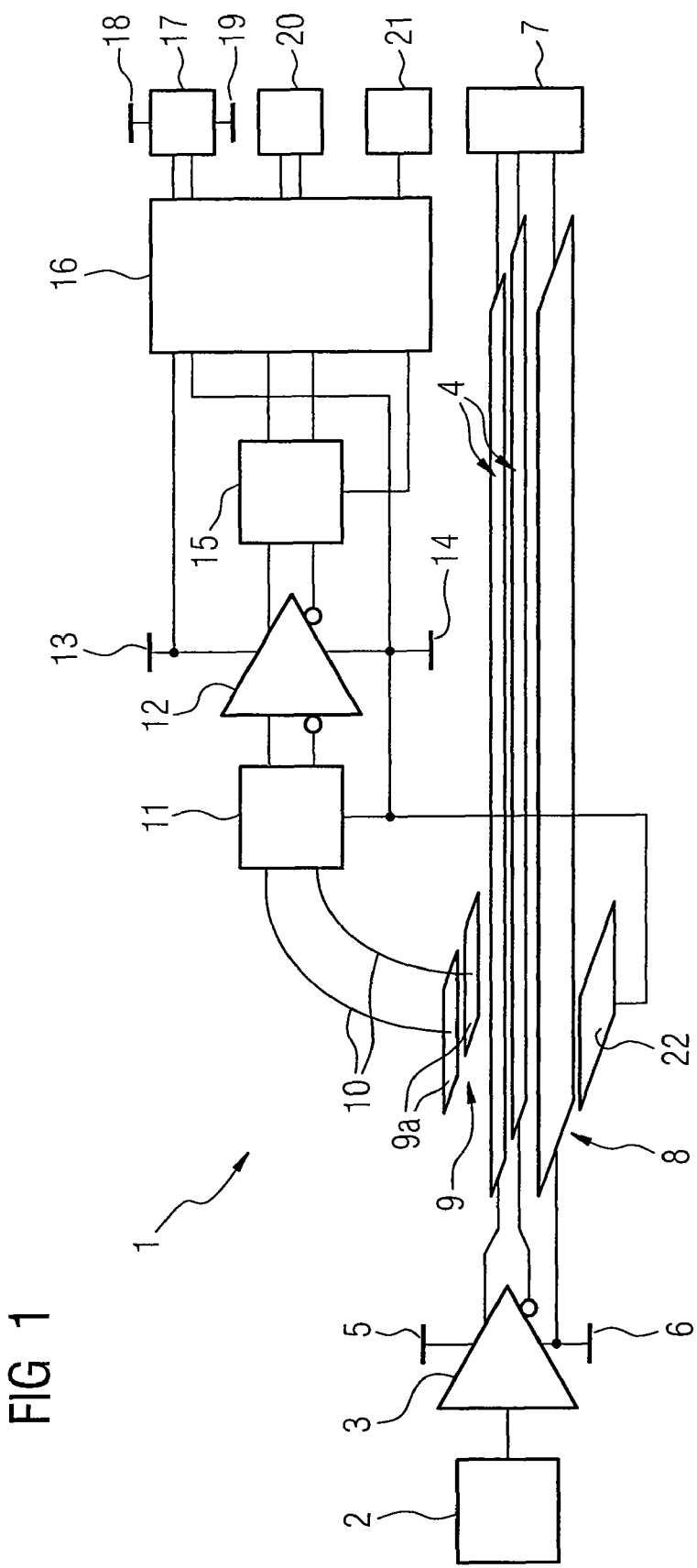
FIG. 1 shows one embodiment of a circuit arrangement for executing a method.

FIG. 1 shows a circuit arrangement 1 for executing a method.

This circuit arrangement 1 has a signal source 2, from which the signal or signals are fed with the aid of a line driver 3 as a differential driver with the polarity inverted with respect to one another into an antenna 4 with two inputs. The positive supply voltage 5 and the ground reference potential TX-GND 6 (ground reference potential of the transmitter) beside the supply voltage 5 are assigned to the line driver 3.

The antenna 4 is a homogeneous double line which has at its end a termination 7. The homogeneous double line of the antenna 4 is terminated by the termination 7 with the characteristic impedance. The signal is fed as described in differential mode into the antenna 4.

In the embodiment described here a further line 8 with the ground reference potential of the transmitter is taken in a homogeneous manner, for example, with geometric dimensions and material properties which are constant over the line length, parallel to the two signal lines of the antenna 4. As a whole, a differential microstrip line on which the rear of a carrier substrate carrying the two signal lines is metalized and is connected to the reference potential of the transmitter.

In other embodiments, other high-frequency transmission line forms can be used, for example, strip lines, or coplanar or leaky feeder lines.

Alternatively, in one embodiment, a ground reference potential taken in parallel is also possible.

If the signal to be transmitted by the line driver 3 is fed onto both lines of the antenna 4 with opposite polarity, then the information which is transmitted over the double line of the antenna 4, for points on the line, which are in each case equidistant from the beginning of the line, results from the difference in potential between the signals of the two lines of the antenna 4. Such a double line has a symmetry plane in the center, on which the potential is 0 in the case of inverse infeed with respect to one another.

An antenna/coupler combination includes a coupler 9 and the antenna 4. The coupler 9 may include two metal surfaces which "hover" over the two lines of the antenna 4, but do not touch the two lines of the antenna 4. The two metal surfaces of the coupler 9 can be introduced into one another by mirroring on the symmetry plane of the antenna.

The coupler 9 may be moved along a curve compared with the antenna, for example, along a straight line guide for the signal transmission to translationally movable modules and also in a ring shape for the signal transmission to rotating modules. These motion options depend on the specific application situation and do not include any prerequisite.

From the coupler 9, lines 10 lead to a filter unit 11 at the input of a receive, or input, amplifier 12. The filter unit 11 terminates the lines 10 between the coupler 9 and the input amplifier 12. The filter unit 11 is designed such that it is optimally dimensioned with respect to common-mode interference suppression. In the embodiment illustrated, a passive filter unit 11 attenuates the common-mode interference fed into a coupler 9 equally and a differential useful signal to be transmitted at the same frequency.

From the filter unit 11, lines lead to the input amplifier 12 of the receiver, to which the positive supply voltage 13 and also the ground reference potential GND 14 are assigned. The differential useful signal is processed further in a signal processing unit 15 connected downstream of the input amplifier 12. The signal processing takes place by the signal processing unit 15 at least partially still in that part of the circuit arrangement 1 which relates to the ground reference potential GND of the receive amplifier.

In the embodiment shown in FIG. 1, a clock or data recovery is performed in the signal processing unit 15 or a corresponding signal processing block. High-frequency signals are still present even after the signal processing in the signal processing block. Alongside this, low-frequency signals for controlling and monitoring the signal transmission and processing are to be forwarded to the remainder of the receiver.

The separation of the ground reference potential GND into the two areas, or ground reference potentials GND and RX-GND, takes place in the following separator unit 16. At the output from the separator unit 16 are then available the power supply (RX for receiver) 17 with the receiver supply voltage 18 (RX-VCC) and also the receiver ground reference potential 19 (RX-GND), such as the separated areas of the ground reference potential or of the supply voltage. The separator unit 16 outputs signals to the signal sink 20 and also further control and/or monitoring signals to the control and/or monitoring unit 21, which complement the useful signals (signal sink 20) as associated control or monitoring signals.

The ground reference system GND 14 of the part of the receiver which includes the input amplifier 12 is coupled capacitively to the ground reference system TX-GND 6 of the transmitter, to which end a metallic structure 22, which is connected to the ground reference potential GND 14, is placed in the vicinity of the ground surface on the potential TX-GND 6 of the transmitter (in accordance with the line 8).

With regard to an antenna/coupler arrangement, which is a homogeneous double line in which a symmetry plane exists on which the potential is 0 when fed inversely with respect to one another, the capacitive coupling of the potentials can be implemented by a metallic structure 22 in this symmetry plane. This allows a coupling structure in the immediate vicinity of the location of the coupling of the differential signal.

Figure 2:
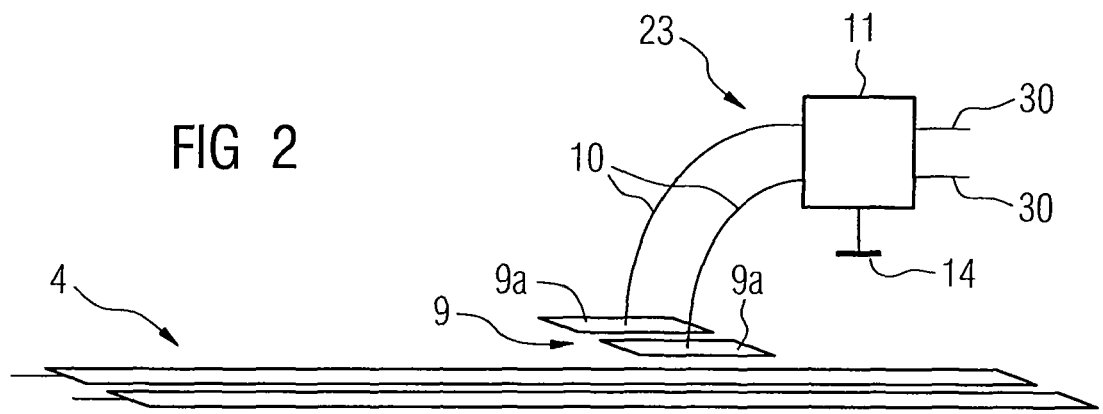
FIGS. 2 and 3 show one embodiment of a filter unit designed as a highpass filter in a circuit arrangement and as an equivalent circuit diagram.

FIG. 2 illustrates one part 23 of the circuit 1 shown in FIG. 1. A modeling can take place using the equivalent circuit diagram illustrated in FIG. 3 for the case where a simple high-pass is implemented.

The symbolic illustration in FIG. 2 shows the double line of the antenna 4 and the coupler 9 with its two coupling surfaces 9a. Lines 10 lead from each of the two coupling surfaces 9a to the filter 11 with the associated ground reference potential 14, where this is the potential GND of the receiver. Two lines 30 lead further from the filter 11 to an input amplifier of the receiver.

Figure 3:
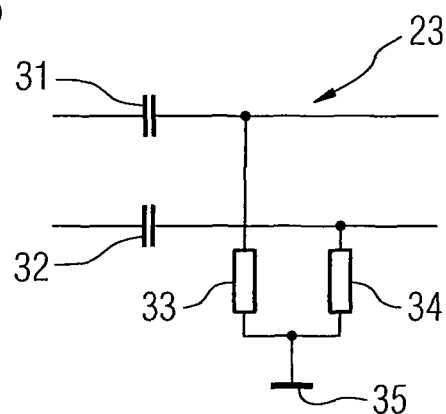

The equivalent circuit diagram in FIG. 3 shows a simple implementation of the circuit part 23 as a highpass filter which is formed from two capacitances 31 and 32, with which the coupler 9 couples the two signals from the double line of the antenna 4 by way of the lines 10 into the lines 30 to the input amplifier which is not shown, and from the two terminating resistances 33 and 34 with the associated ground reference potential GND 35.

With the circuit part 23, which is designed as a highpass filter, it is possible to utilize the transmission function introduced by the filtering in order to attenuate the common-mode interference compared with the useful signal without excessively attenuating the useful signal itself. Accordingly, the two portions of the input signal, the useful signal and the common-mode interference, are situated in different frequency bands, for example in such a manner that the data rate is high frequency and the common-mode interference low frequency.

Figure 4:
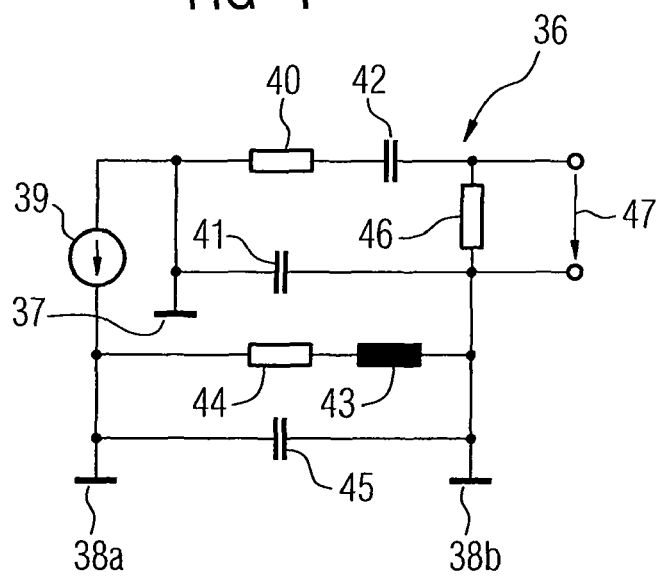
FIG. 4 shows a circuit diagram relating to the description of a suppression of common-mode interference effects and FIG. 5 shows one embodiment of a separating block of a circuit arrangement.

FIG. 4 shows an equivalent circuit diagram 36 for the description of a suppression of common-mode interference effects. In this situation, the common-mode interference effects present on account of the difference in potential between the two ground potentials TX-GND 37 (transmitter ground) and RX-GND 38a (receiver ground) are modeled in this equivalent circuit diagram 36 as a voltage source 39 ($U_{common}$). The common-mode interference is fed in by the two outputs of a line driver onto the two lines of an antenna. The resulting internal resistance of the line driver can be modeled for the common-mode interference as a parallel circuit of the two internal resistances $R_D$ of the individual drivers and results as resistance 40 at $R_D/2$.

With regard to a spectrum of the common-mode interference, which is situated at considerably lower frequencies than the spectrum of the useful signal, delay effects within the coupler structures can be ignored. The coupling can be regarded as purely capacitive. With regard to the coupling by two coupler surfaces of a coupler K, the time responses of the voltage at the two coupler surfaces are taken into consideration. The time responses of the voltage at the two coupler surfaces are identical in the case of common-mode signals, with the result that the coupler can be modeled as a parallel circuit of the two coupler capacitances C of the individual coupler surfaces. From this results the coupling capacitance 42 for common-mode signals at 2·C.

The additionally introduced coupling between the ground reference systems of the transmitter and of the input part of the receiver is modeled as a discrete capacitance 41 ($C_{GK}$).

The decoupling of the ground reference potentials GND 38b and RX-GND 38a can be modeled as a second approximation as inductance 43 ($L_{common}$) with parasitic elements 44, 45 (resistance $R_{common}$ and capacitance $C_{common}$). The parasitic elements may be taken from the data sheets for the component parts used. The parasitic capacitance, however, also depends on the spatial arrangement of the two decoupled circuit parts of the receiver with respect to one another.

For the common-mode portion of the signals on the lines to the two inputs of a differential amplifier, the two terminating resistances R (33 and 34 in FIG. 3) in the circuit act as a parallel circuit with the input impedance 46 at a level of R/2. The voltage 47 dropping at these resistances, which may be referred to as $U_V$, is the common-mode interference occurring at the amplifier. Accordingly, it is possible to dimension the hardware implementation for example in accordance with the circuit arrangement 1 shown in FIG. 1 such that the common-mode suppression as the quotient of the voltage 47 and also of the voltage of the voltage source 39, $$\left(\frac{U_V}{U_{common}}\right),$$

is adjustable. The signal to noise distance, for example, the difference between the differential useful signal and the common-mode interference may be maximized.

Figure 5:
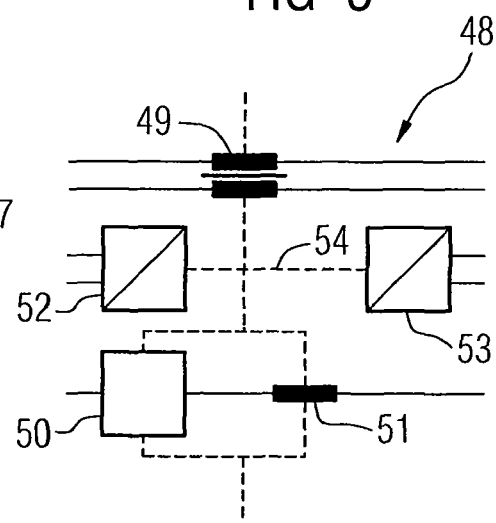

FIG. 5 shows one embodiment of a separating block 48 of a circuit arrangement, for example, for a circuit arrangement in accordance with FIG. 1. For separation of the ground potentials and of the supply voltage lines, the separating block 48 has a common-mode choke coil 49, which shows a high attenuation for the frequency range of the common-mode interference.

A combination of an optocoupler 50 with an inductance 51 is provided for the separation of low-frequency signals. Low-frequency signals are used in a circuit arrangement for example for control and monitoring purposes. The inductances, such as the inductance 51, for example, which are additionally inserted into the corresponding lines, are used in order to counteract the parasitic capacitances of an optocoupler 50 or where applicable of a transducer. This serves to prevent the impedance of the decoupling from becoming too low for the spectral ranges of the common-mode interference to be decoupled on account of the parasitic capacitances.

For the separation of high-frequency signals, an electrooptical converter 52 and an optoelectrical converter 53 in combination with an optical waveguide 54 are furthermore provided. Analog signals may be modulated or digital signals.

An effective reduction or suppression of the relatively strong low-frequency common-mode interference effects occurring during the course of the contactless wideband transmission of differential high-frequency signals between two modules can thus be achieved according to the invention. This is done firstly through the division of the ground reference potentials in the receiver, but additionally also though a suitable filter dimensioning at the input of the input amplifier or a capacitive coupling of ground reference system of the receiver, insofar as this is related to the receiver part containing the input amplifier, to the ground reference system of the transmitter.

The invention claimed is:

1. A method for a contactless transmission of at least one differential signal between a transmitter and a receiver given the existence of at least one common-mode noise signal, the method comprising:
   separating a ground reference potential assigned to the receiver into two ground reference potentials decoupled from one another, and
   suppressing the at least one common-mode noise signal by a filter unit at an input of a receive amplifier of the receiver,
   attenuating, using a passive-filter unit, the at least one common-mode noise signal in a coupler for decoupling at least one signal from the transmitter at the receiver at least essentially to the same extent as a signal of the same frequency to be transmitted, and/or
   capacitively coupling a ground reference potential relating to a part of the receiver including the receive amplifier to a ground reference potential of the transmitter,
   wherein separating the ground reference potential includes modulating an analog signal, encoding a digital signal or modulating the analog signal and encoding the digital signal, and
   wherein an optoelectrical converter and an optical waveguide are used to separate the ground reference potential.

2. The method as claimed in claim 1, comprising separating at least one signal related to the two decoupled ground reference potentials based on the separation of the ground reference potential, the at least one signal being at least one useful signal, at least one control signal, at least one monitoring signal, or at least one power supply signal.

3. The method as claimed in claim 1, comprising separating an associated supply voltage based on the separation of the ground reference potential.

4. The method as claimed in claim 1, comprising separating the ground reference potential in the receiver at a separating point such that at least a part of the at least one common-mode noise signal drops off at the separating point or separating the ground reference potential in a frequency range with a higher spectral power density of the at least one common-mode noise signal.

5. The method as claimed in claim 1, wherein the ground reference potential, a supply voltage or the ground reference potential and the supply voltage are separated by a common-mode choke coil with a greater attenuation in an area of the at least one common-mode noise signal.

6. The method as claimed in claim 1, wherein a low-frequency control signal, a monitoring signal or a low-frequency control and monitoring signal is separated by an optocoupler, a transducer or an optocoupler and transducer.

7. The method as claimed in claim 6, wherein the optocoupler, the transducer or the optocoupler and transducer include parasitic capacitances, and
   wherein an additional inductance is inserted into a line corresponding to the optocoupler, the transducer or the optocoupler and transducer.

8. The method as claimed in claim 6, wherein a high-frequency useful signal is separated by at least one optoelectrical converter in conjunction with an optical waveguide.

9. The method as claimed in claim 1, wherein two identical filters, which are not coupled to one another, are used as the filter unit for the suppression of the at least one common-mode noise signal in a signal line leading from one half of the coupler to the input of the receive amplifier of the receiver.

10. The method as claimed in claim 1, wherein the at least one common-mode noise signal, which is situated in a different frequency band than at least one signal to be transmitted, is suppressed by a transmission function assigned to the filter unit for the suppression of the at least one common-mode noise signal.

11. The method as claimed in claim 1, wherein the filter unit includes a highpass filter for the suppression of the at least one common-mode noise signal.

12. The method as claimed in claim 1, comprising arranging a metallic structure that is connected to a corresponding ground reference potential of the receiver, in the vicinity of a ground reference surface assigned to the ground reference potential of the transmitter.

13. The method as claimed in claim 12, further comprising arranging the metallic structure in a symmetry plane of an antenna/coupler arrangement configured as a homogeneous double line.

14. The method as claimed in claim 1, comprising processing a signal to be transmitted after the signal to be transmitted passes through the receive amplifier of the receiver having the ground reference potential assigned to the receive amplifier.

15. The method as claimed in claim 1, wherein the at least one common-mode noise signal has a low frequency in comparison with at least one signal to be transmitted.

16. The method as claimed in claim 1, wherein separating at least one signal includes separating all of the signals.

17. A circuit arrangement for the contactless transmission of at least one differential signal between a transmitter and a receiver of the circuit arrangement given the existence of at least one common-mode noise signal that has a lower frequency than at least one signal to be transmitted, the circuit arrangement comprising:
- at least one circuit element configured for the separation of a ground reference potential assigned to the receiver into two ground reference potentials decoupled from one another, and/or
- a filter unit at an input of a receive amplifier of the receiver, the filter unit being designed for the suppression of the at least one common-mode noise signal,
- a passive filter unit that attenuates the at least one common-mode noise signal, which is present in a coupler for decoupling at least one signal from the transmitter at the receiver at least essentially to the same extent as a signal of the same frequency to be transmitted, and/or
- at least one circuit element configured for the capacitive coupling of a ground reference potential relating to a part of the receiver including the receive amplifier to a ground reference potential of the transmitter, and
- at least one optocoupler, transducer, or optoelectrical converter in conjunction with an optical waveguide, configured for the separation of at least one signal.

18. The circuit arrangement as claimed in claim 17, comprising a circuit element for capacitive coupling a metallic structure in the vicinity of a ground reference surface assigned to the ground reference potential of the transmitter.

19. The circuit arrangement as claimed in claim 17, comprising a common-mode choke coil for the separation of the ground reference potential, a supply voltage or the ground reference potential and the supply voltage, the common-mode choke coil having a higher attenuation in an area of the at least one common-mode noise signal.

20. A method for contactless transmission of a differential signal between a transmitter and a receiver given the existence of a common-mode noise signal, the method comprising:
- separating a ground reference potential associated with the receiver into two ground reference potentials decoupled from each other to suppress the common-mode noise signal within the receiver; and
- capacitively coupling a ground reference potential relating to a part of the receiver including a receiver amplifier, to a ground reference potential of the transmitter.

21. The method as claimed in claim 20, comprising:
- attenuating, using a passive-filter unit, the common-mode noise signal in a coupler for decoupling a signal from the transmitter at the receiver, at least essentially to the same extent as a signal of the same frequency to be transmitted,
- wherein suppressing the common-mode noise signal within the receiver comprises suppressing the common-mode noise signal by a filter unit at the input of a receive amplifier of the receiver.

* * * * *